Nov. 5, 1940.  S. H. STUPAKOFF  2,220,690
GLASS AND METAL CONSTRUCTION UNIT
Filed March 9, 1937
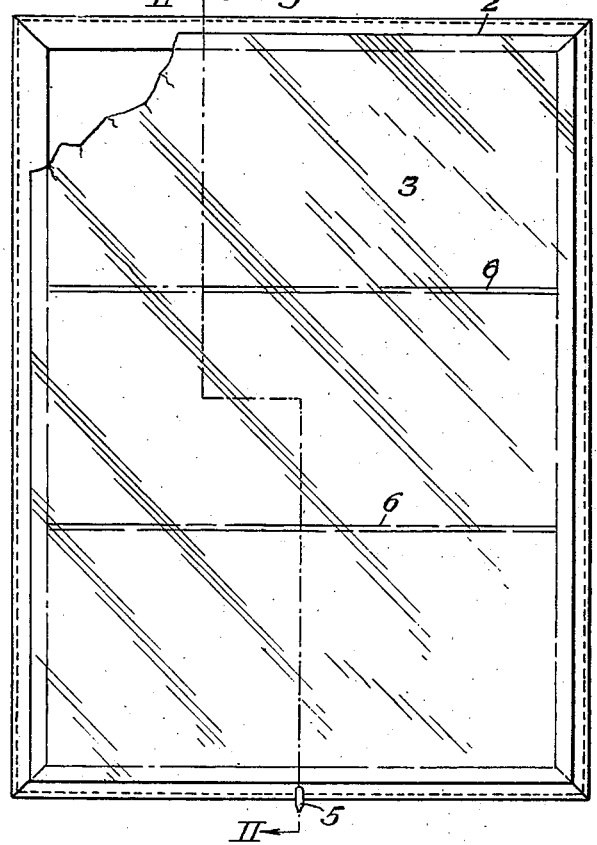
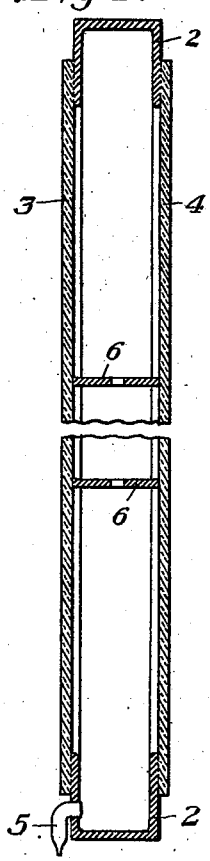
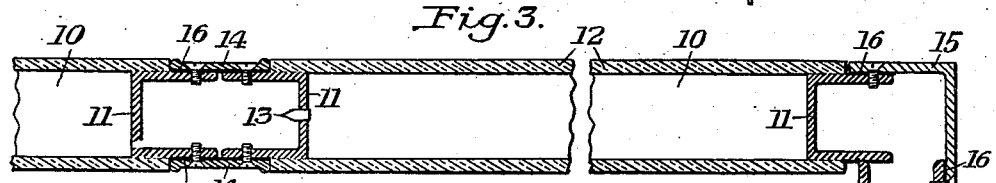
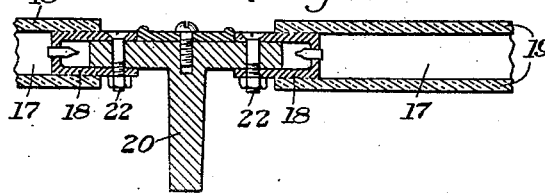
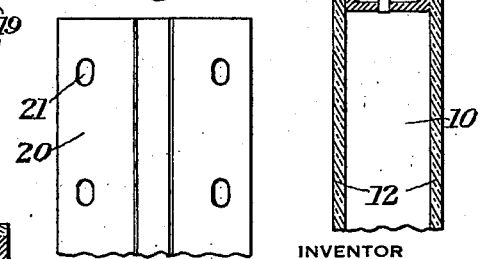
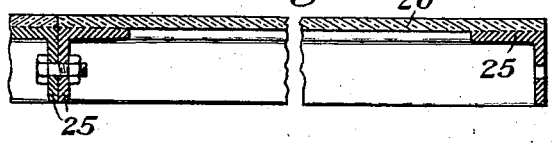
INVENTOR
Semon H. Stupakoff Patented Nov. 5, 1940

2,220,690

UNITED STATES PATENT OFFICE 2,220,690

GLASS AND METAL CONSTRUCTION UNIT

Semon H. Stupakoff, Pittsburgh, Pa., assignor to Stupakoff Laboratories, Inc., Pittsburgh, Pa., a corporation of Pennsylvania Application March 9, 1937, Serial No. 129,881

4 Claims. (Cl. 189—34)

This invention relates to panels formed of glass and metal, useful among other things in connection with buildings, display windows and cases, containers and the like, and is for a construction panel made up of sheet glass and metal.

Glass blocks are frequently employed in the walls of modern buildings. These blocks are usually a few inches square and relatively thick, and are laid with cement in much the same manner as ordinary bricks or ceramic tiles. Where a high degree of heat insulation is required, it has been proposed to make such blocks with an internal cell and in order to increase the insulating property to evacuate the air from this cell. Such units, particularly when evacuated, are quite expensive to make. Being quite thick, they cannot be used where clear visibility is required. Likewise, various containers are constructed of metal and glass wherein a hermetic seal is required between the metal and glass, and frequently it is necessary that the container be of a high insulating character. Also in the case of skylights for certain industrial plants where a closely controlled condition of humidity is required, it is desirable to have an insulating panel which will transmit the light but which will not cause the condensation of moisture inside the building.

According to the present invention, I provide a panel which can be used in various applications where sheet glass is desirable and wherein with the preferred embodiment of the invention a high degree of heat insulating properties can be secured. The invention eliminates the necessity for the use of gaskets or compositions to secure a hermetic seal. At the same time, the panels can be sufficiently rigid for the purpose for which they are intended.

The invention may be readily understood by reference to the accompanying drawing in which:

Figure 1 represents one form of panel adapted for various purposes, made in accordance with my invention;

Figure 2 is a transverse vertical section in the plane of line II—II of Figure 1, but on a larger scale;

Figure 3 represents a section through a composite wall structure comprising a series of panels constructed in accordance with my invention, the panels being of a construction slightly different from that illustrated in Figures 1 and 2;

Figure 4 is another section similar to Figure 3, showing a slightly modified arrangement of panel-supporting structure;

Figure 5 is a detail view showing part of the supporting structure of Figure 4; and Figure 6 is a fragmentary view of a modified panel having a single sheet of glass thereover.

The drawing is for the purpose of illustrating my invention, and the invention is limited in no way to the particular details of construction or assembly or to the shape of the structural metal parts as all of these may be varied to meet the needs of a particular application.

Referring first to Figures 1 and 2, there is shown a rectangular building panel comprising a rectangular frame 2, the metal frame having a cross section of any desired structural shape capable of being rolled or extruded. The corners of the frame are preferably welded together to form a hermetic seal. In Figures 1 and 2 the frame is shown as being comprised of a U-shaped channel section with the flanges of the channel turned inwardly. Fused to the opposite faces of the frame are glass sheets 3 and 4, the sheets being larger than the opening in the frame so that the edges of the sheets lap over the frame, leaving a part of the frame exposed. The lapping of the sheets over the frame enables the sealing of the sheet to the frame to be accurately, tightly and quickly made. The glass is united to the metal by heating the edge portions of the glass and the flanges of the metal until the glass softens and fuses itself to the metal to form a hermetic seal. If necessary, some flux or glaze-forming material may be used in making this joint to facilitate the fusing of the glass to the metal. The fusing is preferably completed to a point where there is a complete hermetic seal between the glass and the metal. The panel may be provided with a tubulation 5 at any suitable point through which air can be exhausted from the interior of the panel after the panel has been assembled, this tubulation being sealed off by welding in the manner of forming vacuum tubes after the desired degree of exhaustion has been reached. In large panels having a relatively high degree of vacuum therein, perforated internal bracing members 6 may be employed to resist atmospheric pressure on the exterior of the glass sheets.

The metal frame and the glass sheets have substantially identical coefficients of thermal expansion, it being necessary to select the structural metal and the glass with matched coefficients of thermal expansion to procure a permanent structure. For example, the structural frame may be one of the stainless steels, in which case the glass employed is a soft glass. A stainless steel having the following typical analysis can be used with a soft glass. The analysis of the metal is:

| | |
|---|---|
| Carbon, maximum | .25 |
| Manganese | 1.00 |
| Phosphorus | .025 |
| Silicon | .50 |
| Chromium | 23.00–30.00 |
| Iron | Balance |

A typical matched soft glass for this metal is that available commercially as "Corning Glass G-12," made by Corning Glass Company. Both the metal and the glass in this instance have thermal coefficients approximating 55×10⁻⁵. Another example is an alloy such as that disclosed in Patent No. 1,942,260, dated January 2, 1934, to Howard Scott, and which is sold commercially under the name of "Kovar". This may be used with a hard glass such as a low-silicate glass, a typical analysis of which is as follows:

| | |
|---|---|
| $SiO_2$ | 67.3 |
| $Al_2O_3$ | 1.73 |
| PbO | None |
| $As_2O_3$ | .14 |
| $Fe_2O_3$ | .11 |
| MgO | .20 |
| $Na_2O$ | 4.56 |
| $K_2O$ | .94 |
| $B_2O_3$ | 24.6 |
| MnO | .01 |
| $SbO_3$ | .08 |

These are merely typical of commercial glasses and metals that can be matched. "Kovar" metal and glass provide a particularly satisfactory combination because "Kovar" has a tenacious natural oxide film which the glass will wet and which will enter into solution with the glass to form a very tight and enduring union.

In the panel the structural metal frame transmits the mechanical load or strain while the glass serves primarily to form the surface of the panel. These panels as so constructed can be assembled into various building and other structures in different ways to provide a construction which has a high degree of light-transmitting properties, but which is well insulated against any conduction of heat therethrough.

In Figure 3 there is shown a slightly modified form of panel and one way of building up a structure from such panels. In this case each panel designated 10 is provided with a metal framing 11, the framing in this instance being illustrated as a channel section with the flanges of the channel turned outwardly. The glass sheets 12 are fused to the flanges of the channel in the manner previously described. 13 designates a tubulation through which air is exhausted from the interior of the panel. The panels are shown as being assembled into a structure by means of connecting plates 14 bolted to the outermost edges of the channel frames 13. The corner is formed by an angular connecting plate 15. Where desired, heat-insulating material may be put in the space formed by the channels and a direct heat-conducting path of any considerable magnitude can be broken by placing heat-insulating material between the connecting plates and the flanges of the channels as indicated by the heavy line 16. In this structure the metal frame members 11 serve to carry the load and transmit strains.

Figure 3 illustrates merely one way of assembling panels into a structure, and it will be understood that this is merely illustrative of my idea and that the invention is not restricted to the particular construction shown.

In some cases it may be desirable to have very heavy load-carrying structural members. The metal used in the panel as having the same coefficient of thermal expansion as the glass, may be a relatively expensive metal. In this case, I have shown panels 17 similar to the panels 10 of Figure 3, formed with a framing 18 of a relatively light section and glass plates 19. The flanges of the frame 18 are secured to heavy structural members such as the T-shaped section 20. The T-shaped section 20 as shown in Figure 5 may be provided with holes 21 through which bolts 22 for securing the panels to the member 20 may pass, the holes 21 being sufficiently larger than the bolts to enable the member 20 to expand and contract independently of the frames 18 of the panels. An arrangement such as this permits the use of evacuated panels with ordinary commercial structural steel. Since the bolts 22 are entirely outside of the evacuated space between the glass sheets 19, no air can possibly enter the panels by reason of this method of bolting the panels in place.

In the preceding embodiments of my invention, I have illustrated the panel as having double thicknesses of glass. In some cases, it may be desirable to have a metal framing with a single thickness of glass. One form of accomplishing this is shown in Figure 6 wherein there are angle bars 25 along at least two edges of the panel. These may where desired be placed along all four edges of the panel. The glass sheet 26 is fused to the legs of the angles as illustrated. Panels such as these may be erected in side-by-side relation as illustrated in Figure 6, the free legs of the adjacent angles being bolted together. Where this type of structure is used, it is possible to have all of the metal either inside or outside of the structure. Panels of this character provide a building panel or structural panel in which the glass and the metal are joined hermetically and without need for any rubber or plastic packing of any kind.

In all cases, the structural frame and the glass are made of metals having matched or substantially matched coefficients of thermal expansion. Various changes may be made in the shape of the structural section used for the framing and in the disposition of this structural shape within the panel according to the requirements of a particular installation. In any case where necessary, cross braces similar to those shown at 6 in Figures 1 and 2, can be employed for reinforcing the glass or preventing the collapse of the glass in a panel of large area wherein the sheets themselves cannot be relied upon to resist the difference in pressure created by the evacuation of the panel. The panels having the air exhausted therefrom may be also utilized in structures where it is desired to get a high degree of soundproofing, as the evacuated space between the spaced sheets of glass will not serve to transmit sound. Sound-deadening insulation can be used in the metal framing similar to the insulation 16. Moreover, the panels may be filled with a liquid or gaseous fluid where it is desired to do so rather than to evacuate the space or to have air in the space between the sheets.

It will be understood that various changes and modifications may be made in the structure within the contemplation of my invention and under the scope of the following claims.

I claim:

1. A glass and metal construction panel comprising a metal frame element of structural shape capable of sustaining a load, a sheet glass element, said glass element and said metal frame element being joined by fusion of a portion of said glass element directly to a portion of said frame element to form a hermetic seal therebetween, the said joined portions of glass and metal having predetermined thermal coefficients of substantially equal value.

2. A glass and metal construction assembly comprising a load carrying frame of structural steel, a metal alloy of predetermined thermal coefficient carried by said frame and secured thereto, a sheet glass element having a predetermined thermal coefficient substantially equal to the thermal coefficient of said metal alloy to form a panel therewith, the said sheet glass element being joined directly to said metal alloy by a fusion of said glass thereon to produce a hermetic seal of said panel elements.

3. A glass and metal construction panel comprising shaped structural metal channel elements defining sides of an enclosed panel chamber containing a confined space capable of being filled or evacuated, a pair of sheet glass elements defining opposed sides of said chamber, the said sheet glass elements being fused directly to said structural metal channel elements to form hermetic seals therewith, the glass and metal elements at their points of fusion having predetermined thermal coefficients of substantially equal value.

4. A glass and metal construction assembly comprising a load carrying metal structure, a metal alloy of predetermined thermal coefficient carried by said structure and secured thereto, said structure and said metal alloy having different thermal coefficients, a sheet glass element having a predetermined thermal coefficient substantially equal to the thermal coefficient of said metal alloy to form a panel therewith, the said sheet glass element being joined directly to said metal alloy by a fusion of said glass thereon to produce a hermetic seal of said panel elements.

SEMON H. STUPAKOFF.